(12) United States Patent
Rao et al.

(10) Patent No.: US 7,774,327 B1
(45) Date of Patent: Aug. 10, 2010

(54) METHOD AND SYSTEM FOR REDUCING BOOT TIME OF A STORAGE SERVER

(75) Inventors: Sriram S. Rao, San Jose, CA (US);
Sandeep Yadav, Santa Clara, CA (US);
John Z. Zhuge, San Jose, CA (US)

(73) Assignee: Network Appliance, Inc., Sunnyvale, CA (US)

( * ) Notice: Subject to any disclaimer, the term of this patent is extended or adjusted under 35 U.S.C. 154(b) by 265 days.

(21) Appl. No.: 11/345,249

(22) Filed: Jan. 31, 2006

(51) Int. Cl.
*G06F 17/30* (2006.01)
(52) U.S. Cl. ..................................... 707/705; 707/821
(58) Field of Classification Search ................. 707/705, 707/821
See application file for complete search history.

(56) References Cited

U.S. PATENT DOCUMENTS

| | | | | |
|---|---|---|---|---|
| 5,666,532 A * | 9/1997 | Saks et al. | ............................ | 1/1 |
| 6,041,334 A * | 3/2000 | Cannon | ............................ | 1/1 |
| 6,381,615 B2 * | 4/2002 | Gaither et al. | ............................ | 1/1 |
| 6,598,037 B1 * | 7/2003 | Craig et al. | ............................ | 1/1 |
| 6,757,695 B1 | 6/2004 | Noveck et al. | | |
| 6,862,589 B2 * | 3/2005 | Grant | ............................ | 1/1 |
| 6,928,446 B2 * | 8/2005 | Westphal | ............................ | 1/1 |
| 6,965,989 B1 | 11/2005 | Strange et al. | | |
| 6,973,466 B2 * | 12/2005 | Kaler et al. | ............................ | 1/1 |
| 6,983,296 B1 * | 1/2006 | Muhlestein et al. | ............................ | 1/1 |
| 2006/0179261 A1 * | 8/2006 | Rajan | ............................ | 711/162 |
| 2006/0184587 A1 * | 8/2006 | Federwisch et al. | ............................ | 707/200 |
| 2007/0162515 A1 * | 7/2007 | Sarma et al. | ............................ | 707/201 |
| 2007/0168633 A1 * | 7/2007 | English et al. | ............................ | 711/165 |
| 2008/0004121 A1 * | 1/2008 | Gatto et al. | ............................ | 463/42 |
| 2008/0045342 A1 * | 2/2008 | Crowder et al. | ............................ | 463/42 |
| 2008/0177994 A1 * | 7/2008 | Mayer | ............................ | 713/2 |

* cited by examiner

*Primary Examiner*—Don Wong
*Assistant Examiner*—Kim T Nguyen
(74) *Attorney, Agent, or Firm*—Blakely, Sokoloff, Taylor & Zafman LLP

(57) ABSTRACT

A storage server maintains an active file system and at least one read-only, persistent point-in-time image (RPPI) of the active file system. The booting time of the storage server is reduced by delaying the mounting of the RPPI(s) until the storage server receives a request to access a corresponding RPPI after the storage server has already booted.

17 Claims, 9 Drawing Sheets

METHOD AND SYSTEM FOR REDUCING BOOT TIME OF A STORAGE SERVER

FIELD OF THE INVENTION

At least one embodiment of the present invention pertains to storage servers, and more particularly, to the boot up process of a storage server.

BACKGROUND

Various forms of network-based storage systems are known today. These forms include network attached storage (NAS), storage area networks (SANs), and others. Network storage systems are commonly used for a variety of purposes, such as providing multiple users with access to shared data, backing up critical data (e.g., by data mirroring), etc.

A network-based storage system typically includes at least one storage server, which is a processing system configured to store and retrieve data on behalf of one or more client processing systems ("clients"). In the context of NAS, a storage server may be a file server, which is sometimes called a "filer". A filer operates on behalf of one or more clients to store and manage shared files. The files may be stored in a storage subsystem that includes one or more arrays of mass storage devices, such as magnetic or optical disks or tapes, by using RAID (Redundant Array of Inexpensive Disks). Hence, the mass storage devices in each array may be organized into one or more separate RAID groups.

In a SAN context, a storage server provides clients with block-level access to stored data, rather than file-level access. Some storage servers are capable of providing clients with both file-level access and block-level access, such as certain Filers made by Network Appliance, Inc. (NetApp®) of Sunnyvale, Calif.

In conventional file servers, data is stored in logical containers called volumes and aggregates. An "aggregate" is a logical container for a pool of storage, combining one or more physical mass storage devices (e.g., disks) or parts thereof into a single logical storage object, which contains or provides storage for one or more other logical data sets at a higher level of abstraction (e.g., volumes). A "volume" is a set of stored data associated with a collection of mass storage devices, such as disks, which obtains its storage from (i.e., is contained within) an aggregate, and which is managed as an independent administrative unit, such as a complete file system. A "file system" is an independently managed, self-contained, hierarchal set of data units (e.g., files, blocks or LUNs). Although a volume or file system (as those terms are used herein) may store data in the form of files, that is not necessarily the case. That is, a volume or file system may store data in the form of other units, such as blocks or LUNs.

A storage server may maintain at least one write-out-of-place file system. In a "write-out-of-place" file system, whenever a data block is modified, it is written to a new physical location on disk. This is in contrast with a "write-in-place" approach, where a data block, when modified, is written in its modified form back to the same physical location on disk. An example of file system software that implements write-out-of-place is the WAFL® file system software included in the Data ONTAP® storage operating system of NetApp.

One feature which is useful to have in a storage server is the ability to create a read-only, persistent, point-in-time image (RPPI) of a data set, such as a volume or a LUN, including its metadata. This capability allows the exact state of the data set to be restored from the RPPI in the event of, for example, a catastrophic failure of the storage system or data corruption.

The ability to restore data from an RPPI provides administrators with a simple mechanism to revert the state of their data to a known previous point in time as captured by the RPPI. Typically, creation of an RPPI or restoration from an RPPI can be controlled from a client-side software tool. An example of an implementation of an RPPI is a Snapshot™, which can be generated by SnapDrive™ or SME (SnapManager® for Microsoft® Exchange), both made by NetApp. (The term "Snapshot" is used in this document without derogation of Network Appliance, Inc.'s trademark rights.) Unlike other RPPI implementations, NetApp Snapshots do not require duplication of data blocks in the active file system, because a Snapshot can include pointers to data blocks in the active file system. The "active" file system is the current working file system, where data may be modified or deleted, as opposed to an RPPI, which is a read-only copy of the file system saved at a specific time.

An example of an RPPI technique which does not require duplication of data blocks to create an RPPI is described in U.S. Pat. No. 5,819,292, which is incorporated herein by reference, and which is assigned to NetApp. The described technique of creating an RPPI (e.g., a Snapshot) does not require duplication of data blocks in the active file system, because the active file system can include pointers to data blocks in an RPPI, for any blocks that have not been modified since the RPPI was created. Among other advantages, this technique allows an RPPI to be created quickly, helps to reduce consumption of storage space due to RPPIs, and reduces the need to repeatedly update data block pointers as required in some prior art RPPI techniques.

Traditionally, during the boot up of a storage server, the operating system of the storage server mounts all of its file systems, including the RPPIs. Mounting a file system includes allocating in-core data structures within the memory of the storage server and reading the metadata of the file system from the mass storage system, i.e., the disk(s), into the allocated data structures. Metadata of a file system describes, for example, the structure of the whole file system, including free space, and provides a basis for locating and accessing data stored in the file system and also managing the file system. The same steps are required to mount an RPPI of a file system. Since the metadata can be stored anywhere on the disk(s), the load involves random disk accesses incurring seeking and rotational latencies. As the number of RPPIs in a file system increases, so does the time needed to mount them. This causes boot time of a storage server to increase linearly with the increase of the number of RPPIs maintained on the storage server. Because a storage server is not accessible during boot up, longer boot time would negatively affect the storage server's availability.

SUMMARY OF THE INVENTION

The present invention includes a method of booting up a storage server which includes a processor and a memory coupled to the processor. The method comprises loading, into the storage server's memory, a part of an active file system during booting up the storage server. The storage server maintains the active file system and at least one read-only, persistent point-in-time image (RPPI) of the active file system. The method further comprises delaying loading of a part of each of the RPPI(s) into the memory until the storage server receives a request to access the corresponding RPPI after the storage server has already been booted.

Other aspects of the invention will be apparent from the accompanying figures and from the detailed description which follows.

BRIEF DESCRIPTION OF THE DRAWINGS

One or more embodiments of the present invention are illustrated by way of example and not limitation in the figures of the accompanying drawings, in which like references indicate similar elements and in which.

DETAILED DESCRIPTION

A method and apparatus for reducing the boot time of a storage server are described. References in this specification to "an embodiment", "one embodiment", or the like, mean that the particular feature, structure or characteristic being described is included in at least one embodiment of the present invention. Occurrences of such phrases in this specification do not necessarily all refer to the same embodiment.

The present invention includes a technique to reduce the boot time of a storage server which maintains an active file system and a number of RPPIs of the active file system. According to the technique, a part of the active file system, i.e. the metadata of the active file system, is loaded into the storage server's memory during the storage server' boot up. Whereas the load of any part of each of the RPPIs is delayed until the storage server receives a request to access the corresponding RPPI after the storage server has already been booted. The aforementioned technique may also be used in a storage server failover setting to reduce the takeover time of a storage server.

Figure 1:
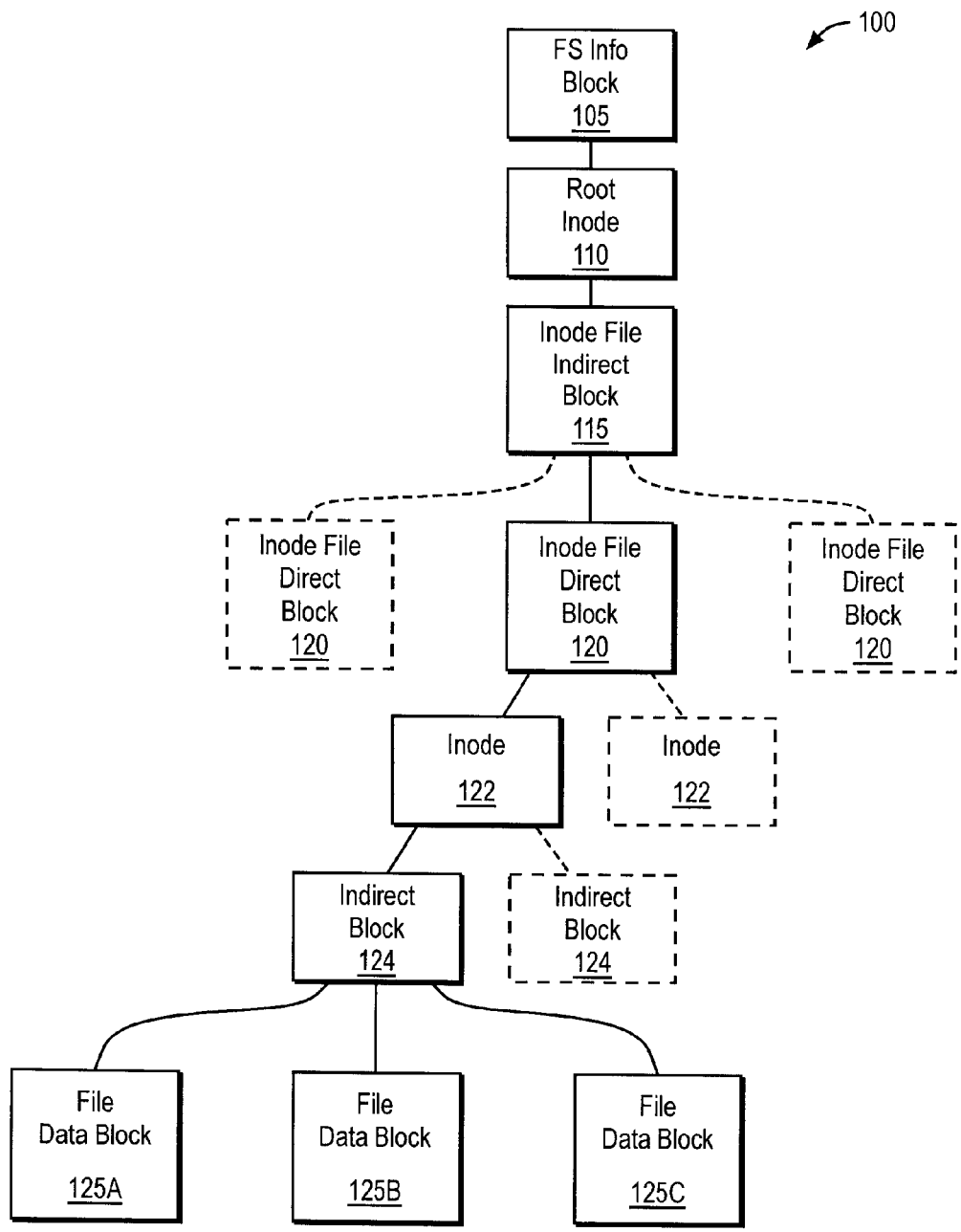
FIG. 1 is a block diagram illustrating an inode based file system.

A file system may be implemented based on inodes and data blocks. An inode is a data structure used to store information, such as metadata, about a file, whereas the data blocks are structures used to store the actual data for the file. A data block may be a direct data block which is used to store the actual data for a file, or it may be an indirect data block which is used to organize a group of direct data blocks together (e.g., including pointers to these direct blocks). The information contained in an inode may include, e.g., ownership of the file, access permission for the file, size of the file, file type and references to locations on disk of the data blocks for the file. The references to the locations of the file data are provided by pointers, which may further reference indirect blocks that, in turn, reference the data blocks, depending upon the quantity of data in the file. An illustrative block diagram of an inode based file system 100 is shown in FIG. 1. A file system information block, fsinfo 105, includes various metadata describing the file system. The fsinfo 105 contains a pointer to a root inode 110 of the file system. The root inode 110 contains pointers to one or more inode file indirect blocks 115. These inode file indirect blocks 115 contain pointers to inode file direct blocks 120. Inode file direct blocks 120 point to inodes 122, which, in turn, contain pointers to indirect blocks 124. The indirect blocks 124 contain pointers to file direct data blocks 125(A-C). Note that the file system 100 may either represent an active file system or an RPPI of an active file system.

Figure 2:
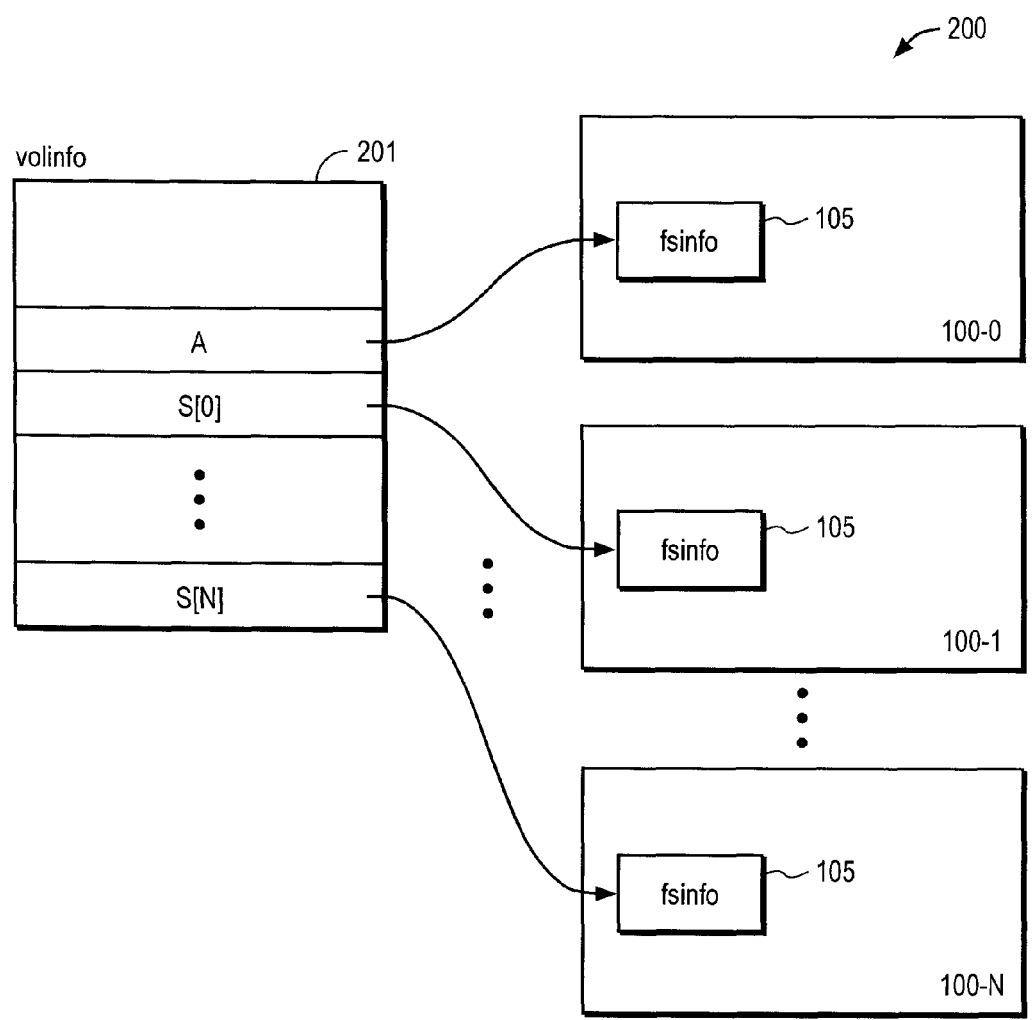
FIG. 2 is a block diagram illustrating a volume which includes an active file system and at least one read-only, persistent point-in-time image of the active file system.

FIG. 2 is a schematic block diagram showing a volume 200 having an active file system 100-0 and a plurality of RPPIs (100-1-100-N) of the active file system. As shown in FIG. 2, the volume 200 has a volume information block, volinfo 201. The volinfo 201, includes a pointer A pointing to the fsinfo 105 of the active file system 100-0 and a group of pointers S[1]-S[N], pointing to the fsinfo 105 of RPPI 100-1-100-N respectively.

Figure 3:
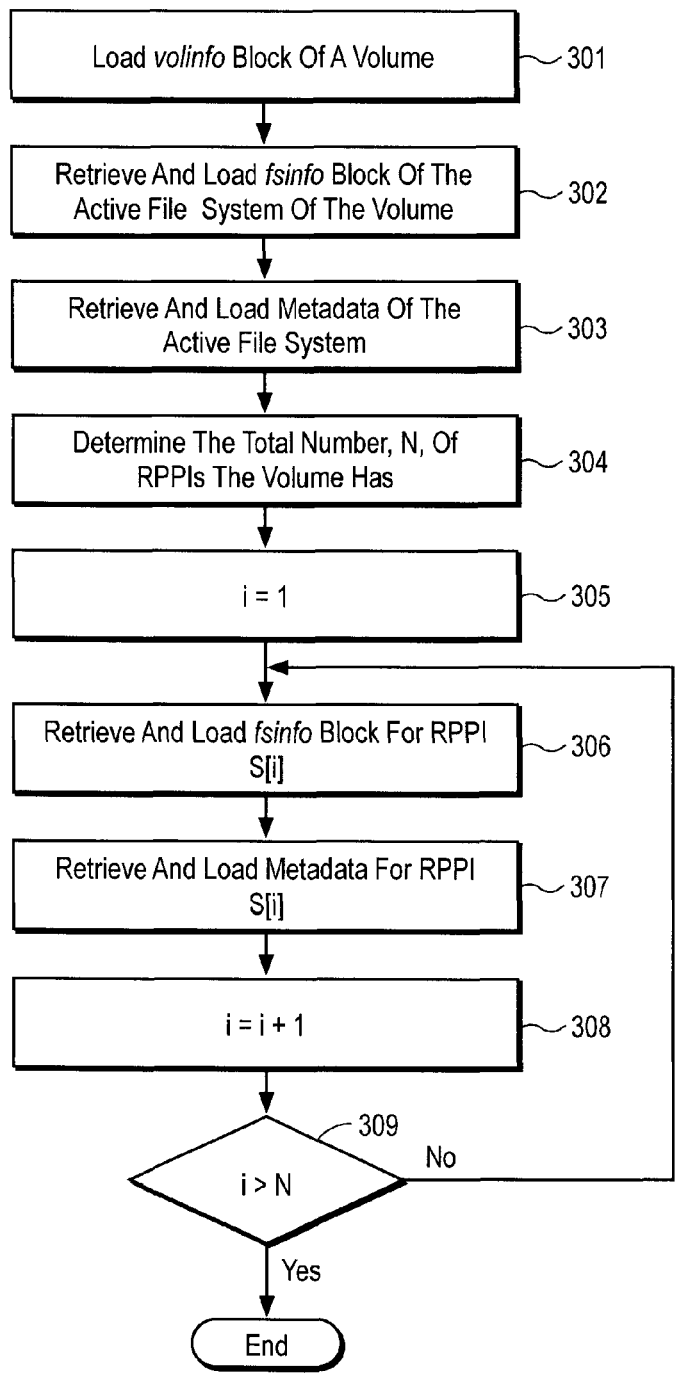
FIG. 3 is a flow diagram illustrating a previous way of mounting a volume such as the one shown in FIG. 2 during a storage server's boot up.
Figure 6A:
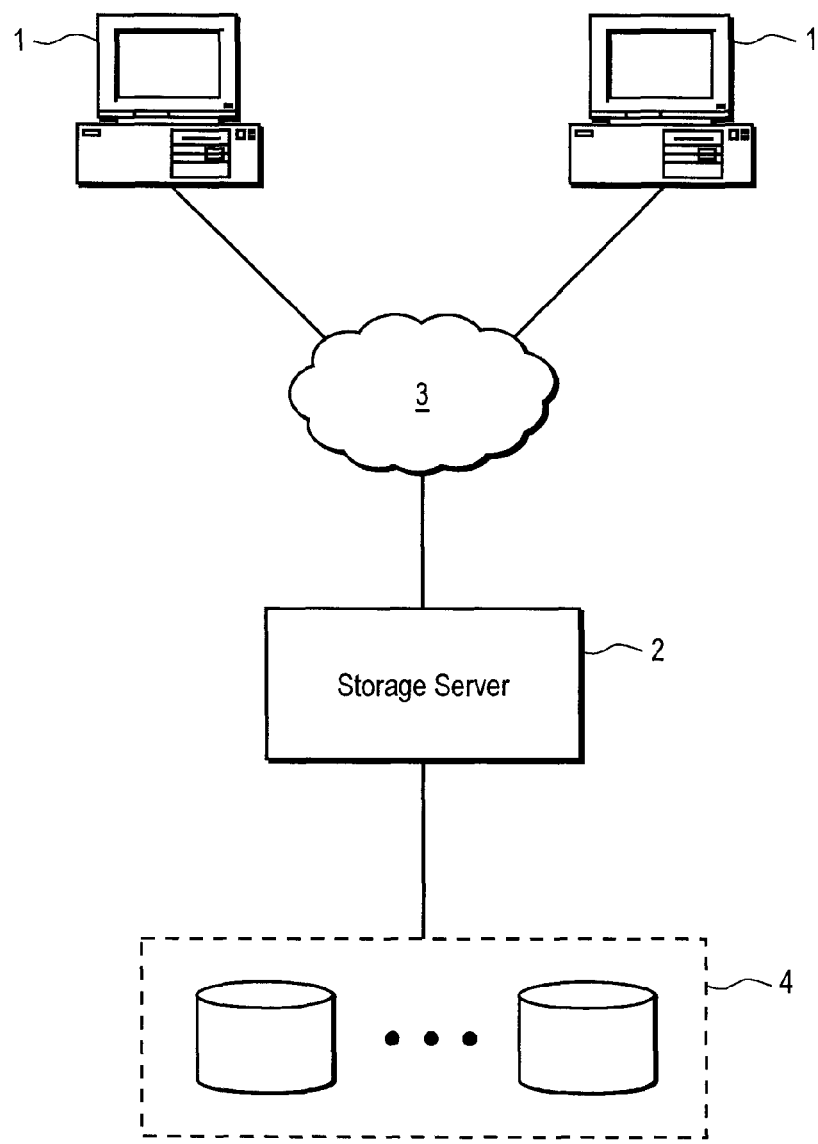
FIG. 6A shows a network environment in which a storage server may be deployed.
Figure 6B:
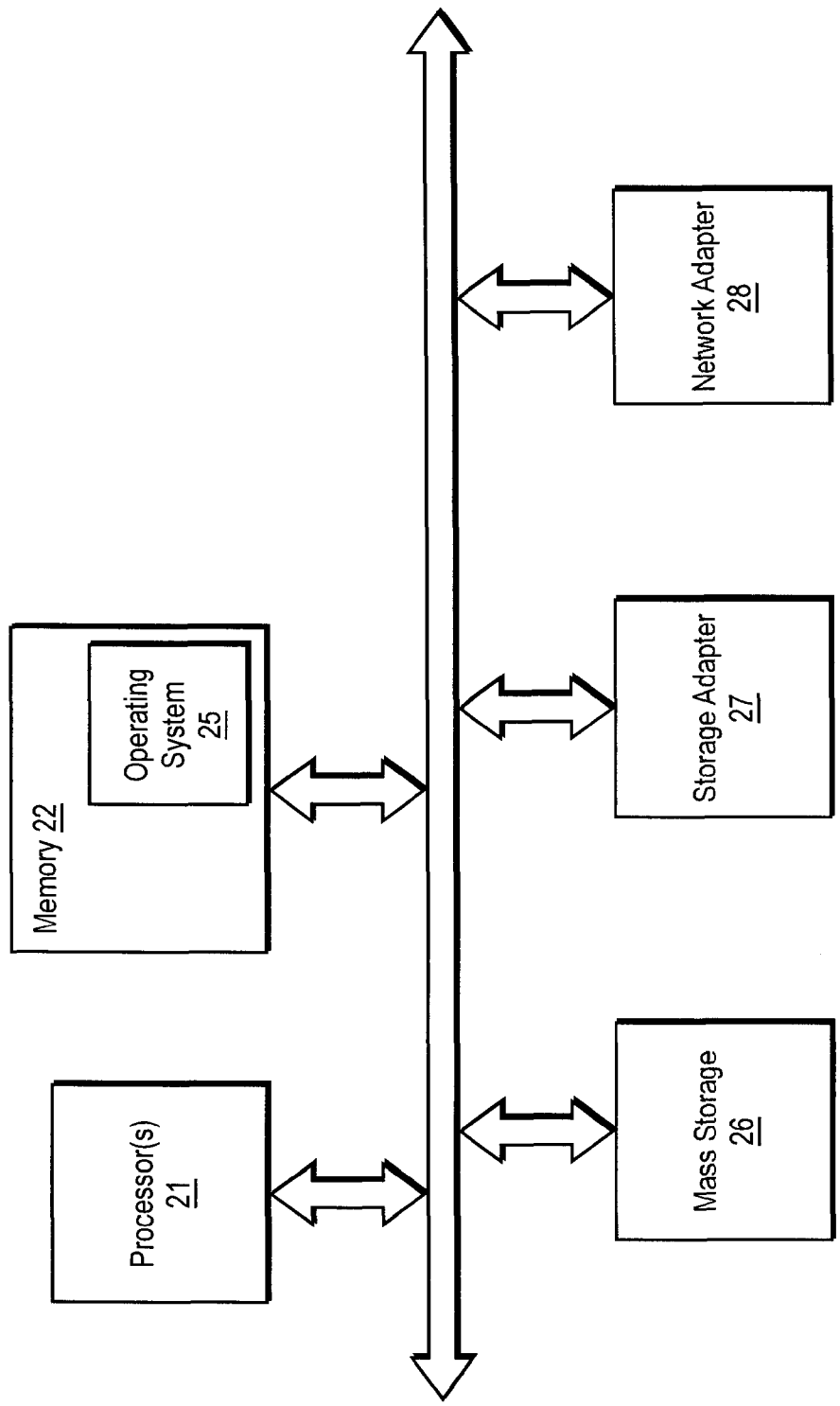
FIG. 6B is a high-level block diagram of a storage server, on which the present invention may be implemented.

FIG. 3 is a flow diagram illustrating a previous way of mounting a volume such as the one shown in FIG. 2 during a storage server's boot up. A storage server is shown in FIGS. 6A-6B and described later. At block 301, the volume's volinfo 201 is loaded into the storage server's memory (such as memory 22 shown in FIG. 6B, hereinafter "the memory") from the storage server's storage subsystem (such as the storage subsystem 4 shown in FIG. 6A, hereinafter "the disk (s)"). Then, at block 302, the fsinfo 105 of the active file system is retrieved and loaded into the memory from the disk(s). At block 303, the metadata of the active file system 100-0 is retrieved and loaded into the memory from the disk (s). Then, at block 304, the number of RPPIs the volume has is determined. A counter i is set to 1 at block 305. At block 306, the fsinfo 105 for RPPI S[i] is retrieved and loaded into the memory from the disk(s). Then, at block 307, the corresponding RPPI S[i]'s metadata is retrieved and loaded into the memory. At block 308, the counter i increases by 1. At block 309, if i is less than or equal to N, the total number of RPPIs the volume has, the flow goes back to block 306 to retrieve and load the fsinfo and metadata for the next RPPI. Otherwise, the flow ends.

Figure 4:
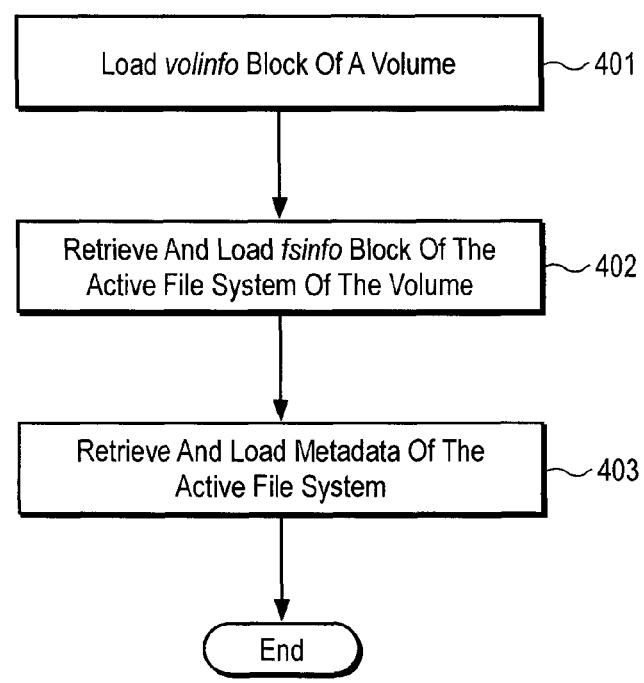
FIG. 4 is a flow diagram illustrating a process of mounting a volume such as the one shown in FIG. 2 during a storage server's boot up according to an embodiment of the present invention.
Figure 5:
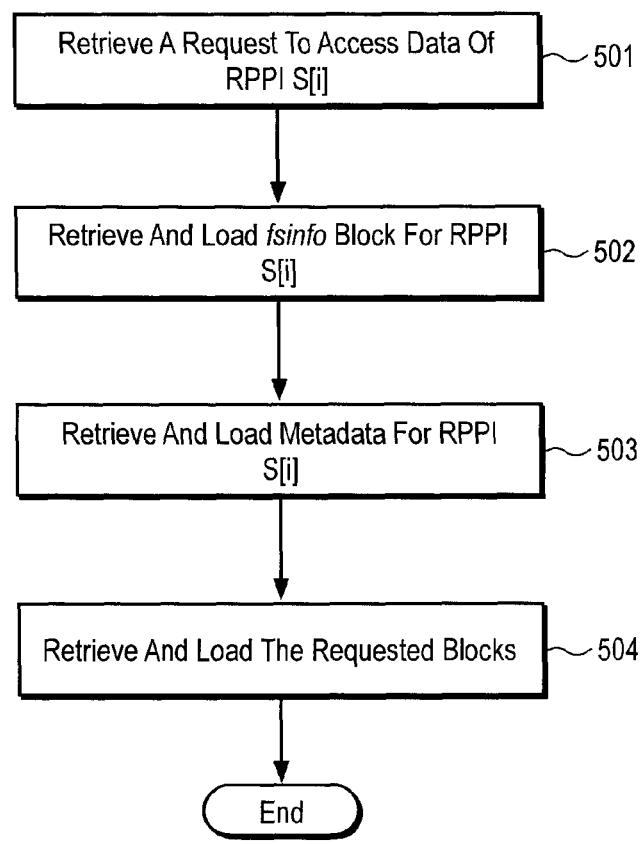
FIG. 5 is a flow diagram illustrating a process of mounting an RPPI maintained on a volume after a storage server on which the volume resides has already been booted.

FIG. 4 is a flow diagram illustrating a process of mounting a volume such as the one shown in FIG. 2, according to an embodiment of the present invention. At block 401, the volume's volinfo 201 is loaded into the memory from the disk(s). At block 402, the fsinfo 105 for the active file system 100-0 is loaded. Similarly at block 403, metadata for the active file system 100-0 is loaded into the memory from the disk(s). However, the load of the fsinfo and metadata for any one of the RPPIs is delayed until data of the corresponding RPPI is requested later after the mounting process illustrated in FIG. 4 finishes. For example, as shown in FIG. 5, after the mounting process in FIG. 4 regarding volume 200 is finished already, and upon a client-initiated request to access data of one of the RPPI S[I], the fsinfo for S[I] is loaded into the memory from the disk(s), at block 502. At block 503, S[I]'s metadata is loaded into the memory from the disk(s). Based on information provided by the metadata, data blocks requested are retrieved and loaded into the memory from the disk(s), at block 504.

By delaying the load of the fsinfo and metadata blocks of each RPPI into the memory from the disk(s), the time required to mount a volume will not be affected by the number of RPPIs of the volume. Because a storage server's boot up process mainly comprises mounting the volume(s) maintained on the server, the server's boot time will not be affected by the number of RPPIs each volume has, either. Compared with the previous way of mounting a volume such as illustrated in FIG. 3, the present invention substantially reduces the boot time of a storage server, when there is a large number of RPPIs maintained on the storage server.

FIG. 6A shows a network environment in which a storage server that implements the technique of FIGS. 4 and 5 may be deployed. A storage server 2 is coupled locally to a storage subsystem 4, which includes multiple mass storage devices (e.g., disks). The storage server 2 is also coupled through a network 3 to a number of storage clients 1 (hereinafter simply "clients"). The storage subsystem 4 is managed by the storage server 2. The storage server 2 receives and responds to various read and write requests from the clients 1, relating to volumes, LUNs, files, and/or other units of data stored in (or to be stored in) the storage subsystem 4.

Each of the clients 1 may be, for example, a conventional personal computer (PC), workstation, or the like. The storage server 2 may be, for example, a file server used in a NAS mode (a "filer"), a block-based storage server such as used in a storage area network (SAN), a storage server which can perform both file-level access and block-level access for clients, or another type of storage server. The network 3 may be, for example, a local area network (LAN), a metropolitan area network (MAN), a wide area network (WAN), a global area network (GAN) such as the Internet, or other type of network or combination of networks. The network 3 may implement, for example, Ethernet protocol, Fibre Channel protocol, or another protocol or a combination of protocols.

The storage subsystem 4 may store data represented in an active file system of the storage server 2 as well as one or more RPPIs. The "active" file system is the current working file system, where data may be modified or deleted, as opposed to an RPPI, which is a read-only copy of the file system saved at a specific time. The mass storage devices in the storage subsystem 4 may be, for example, conventional magnetic disks, optical disks such as CD-ROM or DVD based storage, magneto-optical (MO) storage, or any other type of non-volatile storage devices suitable for storing large quantities of data. The storage devices in the storage subsystem 4 can be organized as one or more RAID groups, in which case the storage server 2 accesses the storage subsystem 4 using an appropriate RAID protocol.

FIG. 6B is a high-level block diagram of the storage server, on which the present invention may be implemented. Certain standard and well-known components which are not germane to the present invention are not shown. The storage server 2 includes one or more processors 21 coupled to a bus system 23.

The bus system 23 in FIG. 6 is an abstraction that represents any one or more separate physical buses and/or point-to-point connections, connected by appropriate bridges, adapters and/or controllers. The bus system 23, therefore, may include, for example, a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire").

The processors 21 are the central processing units (CPUs) of the storage server 2 and, thus, control the overall operation of the storage server 2. In certain embodiments, the processors 21 accomplish this by executing software stored in memory 22. A processor 21 may be, or may include, one or more programmable general-purpose or special-purpose microprocessors, digital signal processors (DSPs), programmable controllers, application specific integrated circuits (ASICs), field-programmable gate arrays (FPGAs), programmable logic devices (PLDs), or the like, or a combination of such devices.

The storage server 2 also includes memory 22 coupled to the bus system 23. The memory 22 represents any form of random access memory (RAM), read-only memory (ROM), flash memory, or a combination thereof. Memory 22 stores, among other things, the operating system 25 of the storage server 2, in which the processes discussed above can be implemented.

Also connected to the processors 21 through the bus system 23 are a mass storage device 26, a storage adapter 27, and a network adapter 28. Mass storage device 26 may be or include any conventional medium for storing large quantities of data in a non-volatile manner, such as one or more disks. The storage adapter 27 allows the storage server 2 to access the storage subsystem 4 which maintains the file system(s) and may be, for example, a Fibre Channel adapter or a SCSI adapter. The network adapter 28 provides the storage server 2 with the ability to communicate with remote devices such as the clients 1 over a network and may be, for example, an Ethernet adapter or a Fibre Channel adapter.

Memory 22 and mass storage device 26 store software instructions and/or data, which may include instructions and/or data used to implement the techniques introduced here. These instructions and/or data may be implemented as part of the operating system 25 of the storage server 2.

Figure 7:
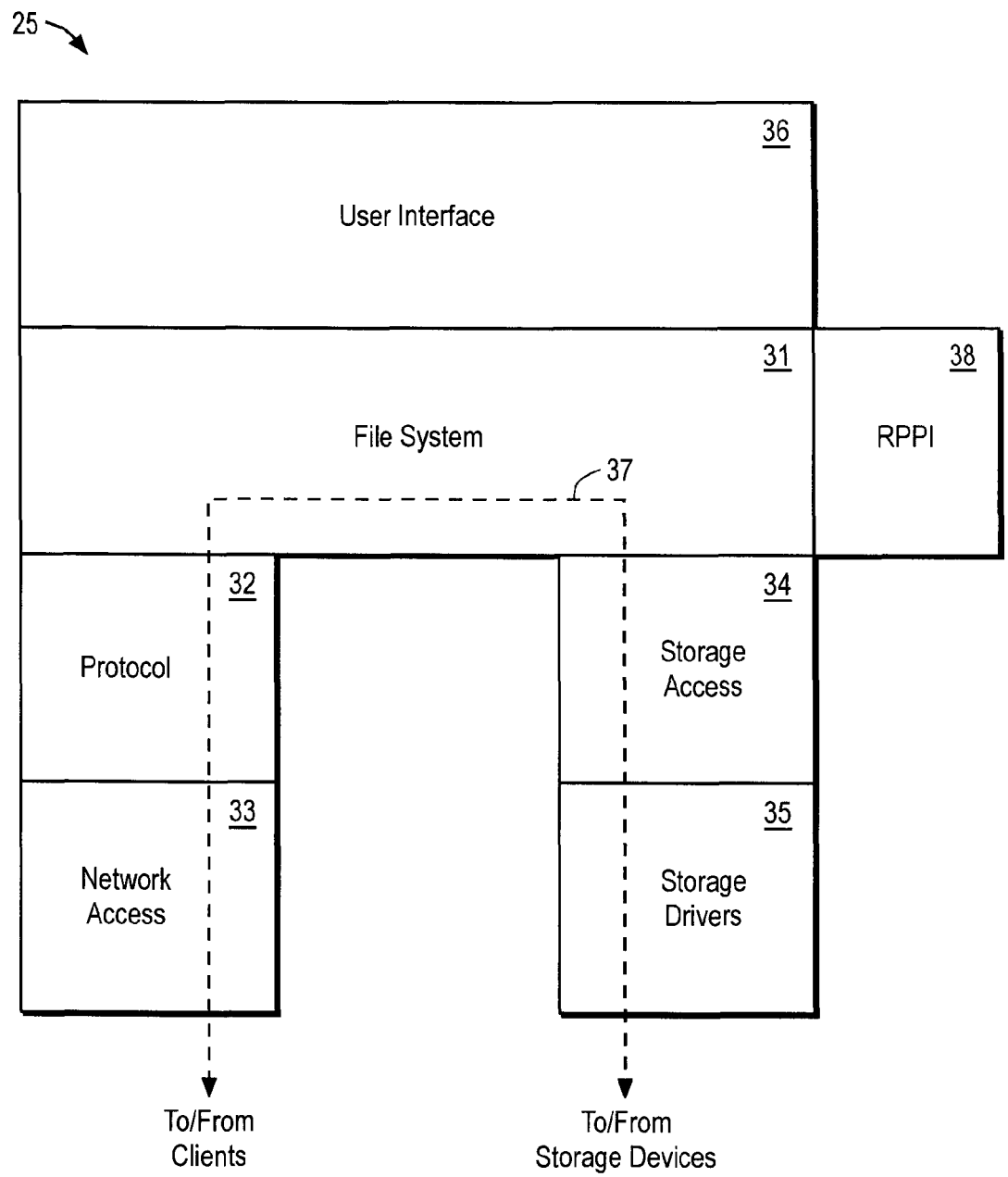
FIG. 7 illustrates the operating system of a storage server.

As shown in FIG. 7, the operating system 25 of the storage server 2 can include several modules, or layers. These layers include a file system layer 31. The file system layer 31 is an application-level programmatic entity which imposes a structure (e.g. hierarchical) on volumes, files, directories and/or other data containers stored and/or managed by a storage server 2, and which services read/write requests from clients of the storage server. An example of a file system layer which has this functionality is the WAFL® file system software that is part of the Data ONTAP® storage operating system from NetApp®.

Logically under the file system layer 31, the operating system 25 also includes a network layer 32 and an associated network media access layer 33, to allow the storage server 2 to communicate over a network (e.g., with clients 1). The network 32 layer implements various protocols, such as NFS, CIFS, HTTP, SNMP, and TCP/IP. The network media access layer 33 includes one or more drivers which implement one or more protocols to communicate over the interconnect 3, such as Ethernet or Fibre Channel. Also logically under the file system layer 31, the operating system 25 includes a storage access layer 34 and an associated storage driver layer 35, to allow the storage server 2 to communicate with the storage subsystem 4. The storage access layer 34 implements a storage redundancy protocol, such as RAID-4 or RAID-5, while the storage driver layer 35 implements a lower-level storage device access protocol, such as Fibre Channel or SCSI. Reference numeral 37 in FIG. 7 shows the data access path through the operating system 25, associated with servicing read and write requests from clients.

The operating system 25 may also include an RPPI layer 38, which interfaces with the file system layer 31 and external RPPI client software, to allow creation of RPPIs and restoration of data from RPPIs. The operating system 25 may further include a user interface layer 36, which implements a graphical user interface (GUI) and/or a command line interface (CLI), for example, such as for purposes of administrative access to the storage server 2.

Figure 8:
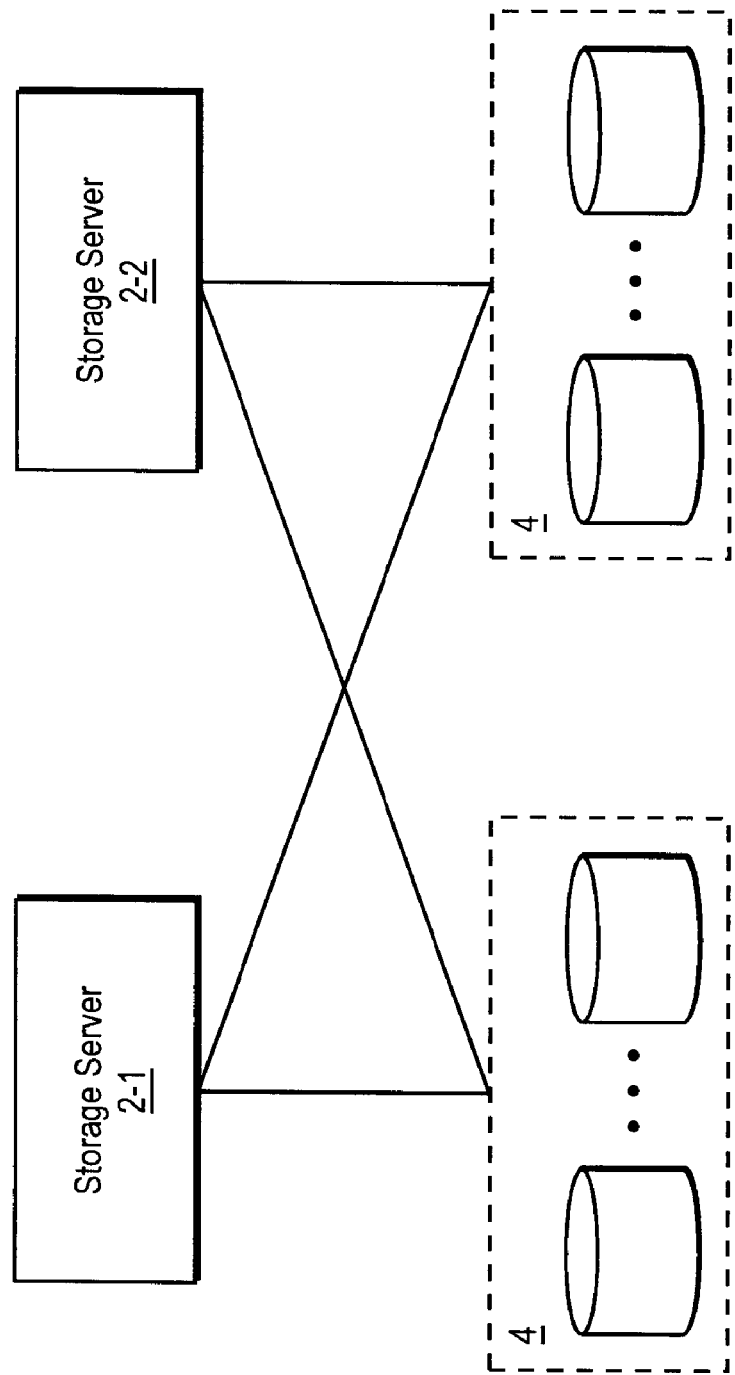
FIG. 8 is an exemplary schematic block diagram illustrating an environment in which the present invention may be implemented.

FIG. 8 is an exemplary schematic block diagram illustrating an environment in which the present invention may be implemented. As shown in FIG. 8, two storage servers 2-1 and 2-2 can access each other's storage subsystem 4, where file systems (or volumes) are maintained. This architecture design may be used for failover purposes. For example, when storage servers 2-1 and 2-2 are booted, volumes on 2-1's storage subsystem 4-1 will be mounted on storage server 2-1, while volumes on 2-2's storage subsystem 4-2 will be mounted on storage server 2-2. However, if storage server 2-1 fails and becomes unavailable for some reasons, volumes mounted on storage server 2-1 will be unavailable, too. However, with the architecture design shown in FIG. 8, storage server 2-2 may takeover 2-1's role and mount the volumes maintained on storage server 2-1's storage subsystem 4-1 so that they will still be available to users. In this case, the takeover time is the time needed to mount the volumes maintained on server 2-1's storage subsystem 4-1 by server 2-2. With the previous way of mounting a volume on a storage server, the takeover time will be linear to the number of RPPIs maintained on the storage server 2-1. If the present invention is applied in this scenario, the takeover time will not be affected by the number of RPPIs on server 2-1, and will be substantially short, compared with the previous way of mounting a volume, if there is a large number of RPPIs on the storage server 2-1.

Thus, a method and system for reducing the boot time as well as the takeover time of a storage server have been described.

Software to implement the technique introduced here may be stored on a machine-readable medium. A "machine-accessible medium", as the term is used herein, includes any mechanism that provides (i.e., stores and/or transmits) information in a form accessible by a machine (e.g., a computer, network device, personal digital assistant (PDA), manufacturing tool, any device with a set of one or more processors, etc.). For example, a machine-accessible medium includes recordable/non-recordable media (e.g., read-only memory (ROM); random access memory (RAM); magnetic disk storage media; optical storage media; flash memory devices; etc.), etc.

"Logic", as is used herein, may include, for example, software, hardware and/or combinations of hardware and software.

Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

What is claimed is:

1. A method of booting up a storage server which includes a processor and a memory coupled to the processor, the method comprising:

loading, into the memory, a first part of an active file system during booting up the storage server, wherein the storage server maintains the active file system and a read-only, persistent point-in-time image (RPPI) of the active file system, wherein the active file system is an inode based file system, which comprises a file system information block, a plurality of inode blocks storing metadata of the active file system, and a plurality of data blocks storing actual data of the active file system;

delaying loading of any part of the RPPI into the memory until the storage server receives a request to access the RPPI after the storage server has already been booted; and loading the RPPI into the memory upon receiving the request.

2. The method of claim 1, wherein said first part of the active file system includes the file system information block and at least part of the plurality of mode blocks of the active file system.

3. The method of claim 2, wherein said any part of the RPPI may include the file system information block and at least part of the plurality of mode blocks of the RPPI.

4. The method of claim 3, wherein the active file system is a write out-of-place file system.

5. The method of claim 4, wherein the RPPI references at least a second part of the active file system when the RPPI is created without duplicating said second part of the active file system.

6. The method of claim 5, wherein the storage server maintains a volume, the volume including the active file system and the RPPI.

7. A method of reducing boot-up time of a storage server which includes a processor and a memory coupled to the processor, the method comprising:

loading, into the memory, a first part of an active file system during booting up the storage server, wherein at least part of said first part of the active file system is loaded into the memory before any other part of the active file system may be accessed, wherein the storage server maintains the active file system and a read-only, persistent point-in-time image (RPPI) of the active file system, wherein the active file system is an inode based file system, which comprises a file system information block, a plurality of inode blocks storing metadata of the active file system, and a plurality of data blocks storing actual data of the active file system;

delaying loading of a part of the RPPI into the memory until the storage server receives a request to access a data set in the RPPI after the storage server has already been booted; and loading at least part of said part of the RPPI into the memory upon receiving the request.

8. The method of claim 7, wherein the RPPI references at least a second part of the active file system when the RPPI is created without duplicating said second part of the active file system.

9. The method of claim 8, wherein the storage server maintains a volume, the volume including the active file system and the RPPI.

10. A storage system comprising:

a processor;

a mass storage device, the mass storage device maintaining a file system, wherein the file system comprises an active file system and a read-only, persistent point-in-time image (RPPI) of the active file system; and a memory coupled to the processor, the memory storing instructions which when executed by the processor, cause the processing system to perform a process, the process comprising:

mounting the active file system during a boot up of the storage system, wherein said mounting the active file system comprises allocating, in the memory, first in-core data structures for storing a part of the active file system, and reading, from the mass storage device, the part of the active file system into said first in-core data structures in the memory, wherein the active file system is an inode based file system, which comprises a file system information block, a plurality of inode blocks storing metadata of the active file system, and a plurality of data blocks storing actual data of the active file system; and mounting the RPPI after said boot up of the storage server has finished and upon a request to access a first part of the RPPI, wherein said mounting the RPPI comprises allocating, in the memory, second in-core data structures for storing a second part of the RPPI, and reading, from the mass storage device, the second part of the RPPI into said second in-core data structures in the memory.

11. The storage system of claim 10, wherein the active file system comprises a first file system information block, a first plurality of blocks storing metadata of the working file system, and a second plurality of blocks storing actual data of the active file system, wherein the part of the active file system includes the first file system information block and at least part of the first plurality of blocks.

12. The storage system of claim 11, wherein the RPPI comprises a second file system information block, a third plurality of blocks storing metadata of the RPPI, and a fourth plurality of blocks storing actual data of the RPPI, wherein said second part of the RPPI includes the second file system information block and at least part of the third plurality of blocks.

13. The storage system of claim 12, wherein the active file system is a write out-of-place file system.

14. The storage system of claim 12, wherein the RPPI references at least some blocks of the active file system when the RPPI is created, without duplicating said some blocks of the active file system.

15. A method comprising:
starting a boot up process of a storage server, wherein the storage server maintains at least one volume, each volume including an active file system and an RPPI of the active file system, wherein each active file system and RPPI is an inode based file system, which comprises a file system information block, a plurality of inode blocks storing metadata of the active file system, and a plurality of data blocks storing actual data of the active file system;
during the boot up process of the storage server, mounting the active file system of each volume, without mounting any RPPI of the active file system of each volume; and
mounting the RPPI of the active file system upon receiving a request to access the RPPI of the active file system after the boot up process has been completed.

16. The method of claim 15, wherein said mounting the active file system of each volume comprises:
allocating, in a memory, in-core data structures for storing a part of the active file system of the corresponding volume; and
loading the part of the active file system of the corresponding volume into said in-core data structures.

17. The method of claim 16, wherein said part of the active file system of each volume includes at least metadata of the active file system of the corresponding volume.

\* \* \* \* \*